United States Patent [19]

Rudi

[11] Patent Number: 5,596,762
[45] Date of Patent: Jan. 21, 1997

[54] SMALL-SIZE COMPUTER HAVING PLUGGABLE MEMORY UNIT FOR DATA PROTECTION

[75] Inventor: Guttorm Rudi, Fjellhamar, Norway

[73] Assignee: Tandberg Data Storage AS, Oslo, Norway

[21] Appl. No.: 612,426

[22] Filed: Nov. 9, 1990

[30] Foreign Application Priority Data

Nov. 10, 1989 [DE] Germany .......................... 39 37 541.2

[51] Int. Cl.⁶ ................................................. G06F 13/00
[52] U.S. Cl. ................. 395/800; 364/236.6; 364/238.3; 364/248.2; 364/284.2; 364/285.1; 364/DIG. 1
[58] Field of Search .................................... 395/325, 425, 395/800; 360/96.5

[56] References Cited

U.S. PATENT DOCUMENTS

| | | | |
|---|---|---|---|
| 4,677,508 | 6/1987 | Barton, Jr. et al. | 360/96.5 |
| 4,833,554 | 5/1989 | Dalziel et al. | 360/98.04 |
| 4,866,552 | 9/1989 | Nagase | 360/96.5 |
| 5,113,500 | 5/1992 | Talbott et al. | 395/325 |

FOREIGN PATENT DOCUMENTS

| | | |
|---|---|---|
| 0214820 | 3/1987 | European Pat. Off. . |
| 0228286 | 7/1987 | European Pat. Off. . |
| WO88/06793 | 9/1988 | WIPO . |
| WO88/06780 | 9/1988 | WIPO . |

*Primary Examiner*—Kevin J. Teska
*Assistant Examiner*—Ayni Mohamed
*Attorney, Agent, or Firm*—Hill, Steadman & Simpson

[57] ABSTRACT

In a small size computer, and particularly a portable personal computer, a streaming mode tape recorder is coupled via a plug connector for data protection or backup. A plug connector via which the tape recorder is connected includes line connections for data signal lines and control signal lines as well as power supply lines. The plug connector, when the tape recorder is not plugged in is covered by a pivotable door arranged at a wall surface of the computer housing, the door also including means for securing the tape recorder in the plugged position.

14 Claims, 3 Drawing Sheets

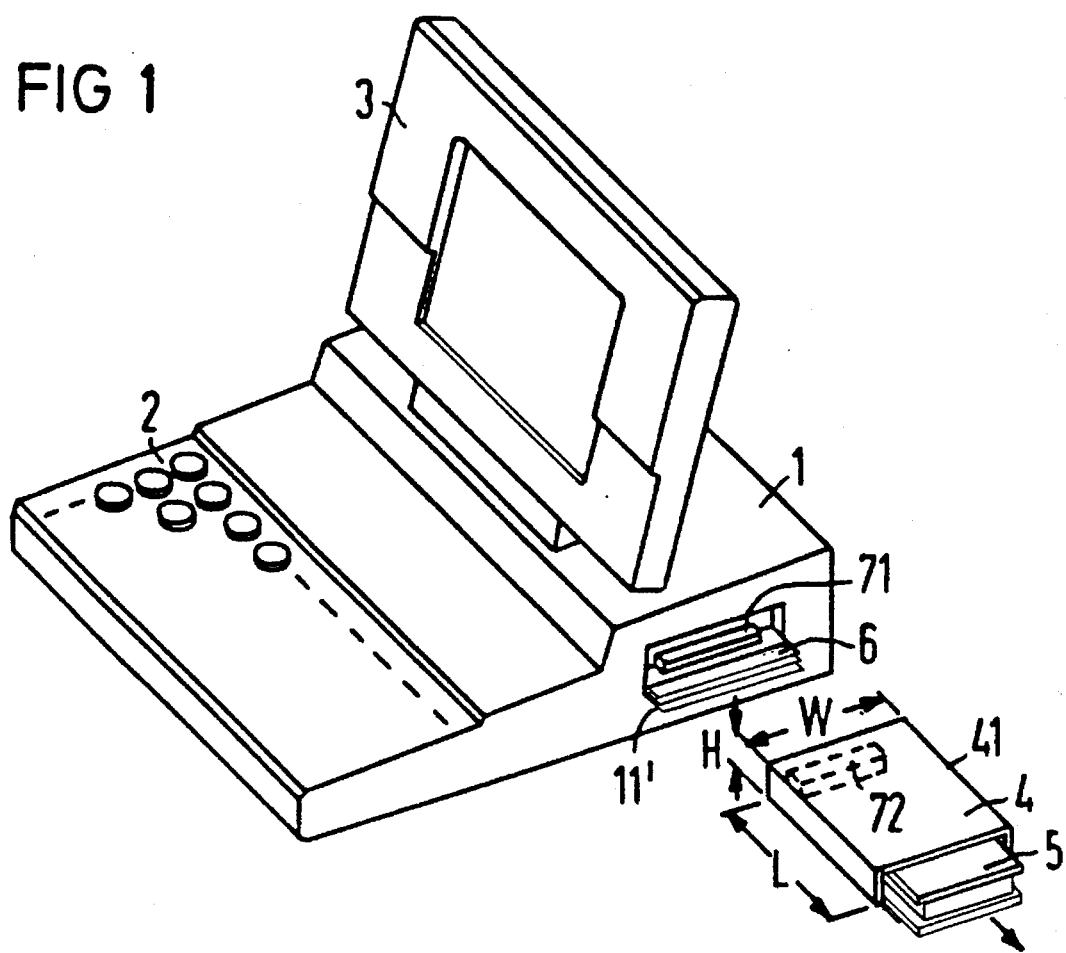
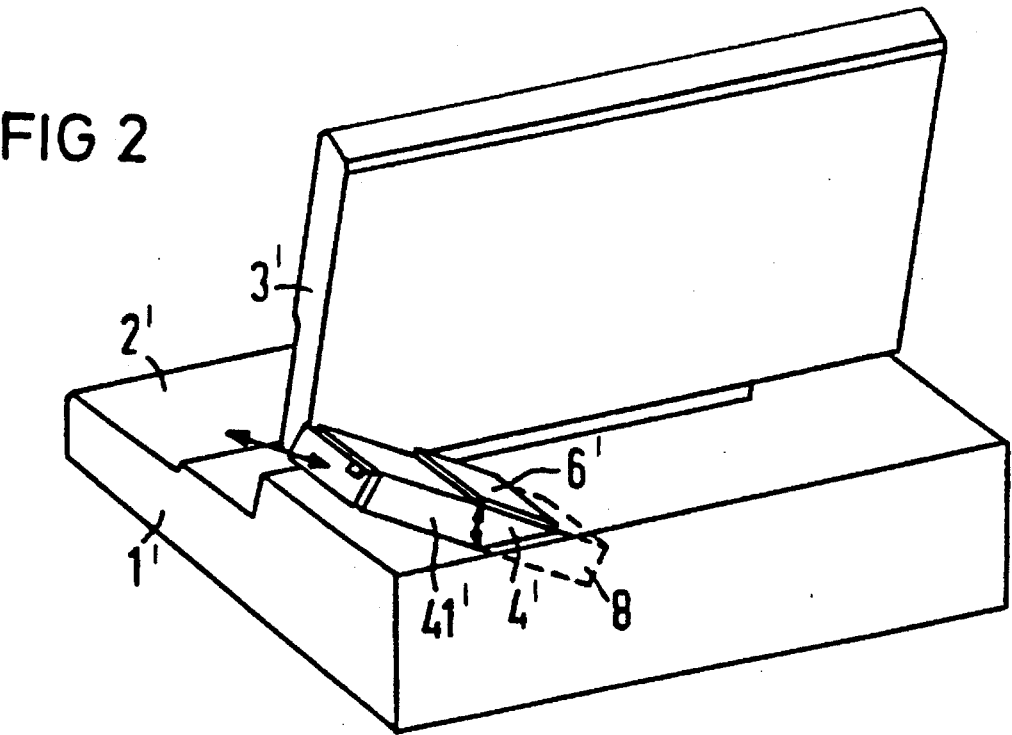

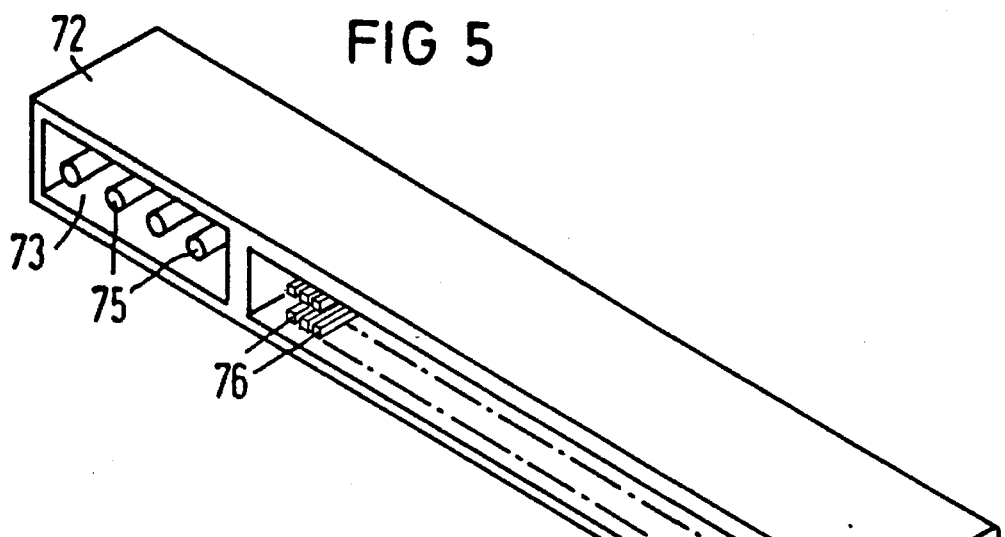
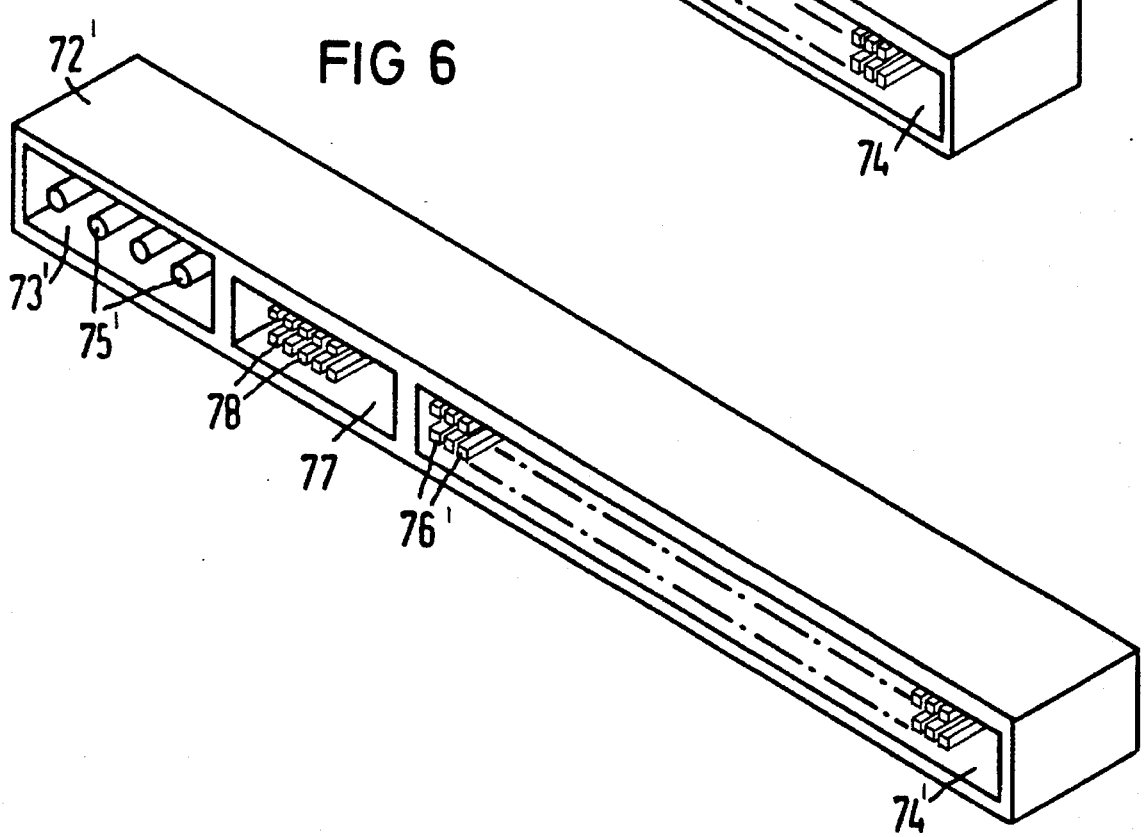

SMALL-SIZE COMPUTER HAVING PLUGGABLE MEMORY UNIT FOR DATA PROTECTION

BACKGROUND OF THE INVENTION

1. Field of the Invention

The present invention relates generally to a small-size computer and, more particularly, to a portable personal computer having a computer module arrange in a housing to which a data display field and an input keyboard are connected.

2. Description of the Related Art

The progress of technology makes it possible to achieve greater and greater computing power in personal computers that, at the same time, are of a more and more compact size. This is true of the entire product line of small size computers which, in an upper performance range, are commonly referred to as "desk-top" computers but is also particularly true for portable computers of a generally lower performance range which are referred to as either "lap-top" or "notebook" computers. Improvements in technology are especially noticeable in these portable computers due to the specific boundary conditions which are imposed for "lap-top" and "notebook" computers. For example, the price/performance ratio of the computer is important, and maintaining a minimum volume and weight play a critical part in the manufacture of portable computers in this lower performance range. Last but not least, the energy consumption by the computer when operating is extremely critical since, according to their intended use, these portable computers should be operable for as long as possible independently of the main, or central, power supply. In other words, portable computers should have as long a battery life as possible while being as small and light in weight as possible.

There has already been great success in optimizing hard disc storage in view of the above demands to such an extent that this type of storage medium is already used in portable computers. Both the floppy disc and hard disc storage units currently utilized in lap-top computers are of dimensions corresponding to what is referred to as a 3½ inch form factor. This is an industrial standard which defines a height H of 46.3 mm, a width W of 101.6 mm and a length L of 146.1 mm as the mounting dimensions. In the U.S. Customary System this corresponds to a height H of 1⅜ inch, a width W of 4 inches and a length L of 5¾ inch. In lap-top and other compact computers, however, storage units of the 3½ inch form factor having a reduced height of 25.4 mm, corresponding to 1 inch in height, are utilized.

Greater and greater attention must be paid to the protection of data bases in personal computers in this performance range so that the capacity of a data protection store, or backup store, must grow correspondingly. Even with an anticipated capacity of approximately 20 Mb, the floppy disc storage media presently used in data backup in small size, lower performance computers will no longer be able to handle the job of backing up data. Therefore, a better means for data protection in portable computers is needed. The problem also arises of offering appropriate possibilities of protecting the processed data for high-performance personal computers.

The incorporation of further integrated memory capacity in the computer module itself which would be usable for this purpose is opposed by the afore-mentioned, critical boundary conditions such as volume, weight, and under certain circumstances, the energy consumption of the memory. This is particularly true for the portable computers in the lower performance range.

One can envision, however, providing stationary equipment such as docking stations to which the portable small-size computers may be connected for the transmission of data in order to execute printing events, as well as for further processing of the data stored in the small-size computer in some other way or for protecting or backing up this data as well. These preliminary solutions, however, do not appear to be fully satisfactory for data protection. For reasons for high operating comfort and safety and to provide a broad range of applications, the storing of data for the purpose of data protection, or backup, should be arbitrarily possible in and of itself during ongoing operation of the computer system and should not be dependent on the momentary availability of a stationary base unit.

SUMMARY OF THE INVENTION

It is therefore an object of the present invention to create the possibility of data protection or data backup for a small-size computer which is also adapted to the performance capability of future small-size computers, which themselves in turn lie within an appropriate framework with respect to volume, weight, and memory capacity.

In a small-size computer and, in particular, a portable personal computer of the type initially described, this and other objects are achieved by a memory unit for data protection which is in the form of a streaming mode tape recorder to which one part of a two part standardized multiple pin connector for connecting the streaming mode tape recorder to the small size computer is connected. The other part of the multiple pin connector is provided in the computer housing for direct connection of the streaming mode tape recorder to or in the computer housing.

The present solution initially proceeds on the assumption that steady progress in the field of cassette tape recorders for data storage has shown that there is definite possibilities in this type of storage media for further miniaturization even with a continuing increase in capacity. Furthermore, what are referred to as "streaming mode" tape recorders have matured to such an extent that usable data transmission rates are currently achievable with them. These data transmission rates play a critical part specifically in data protection or backup since relatively large data sets must be transmitted between small size computers and data protection or backup storage media in this operating case. On the other hand, streaming mode tape recorders can be relatively simply constructed since they do not need to work in the start-stop mode but can continuously record a data stream in ongoing operation. Therefore, streaming mode tape recorders have a favorable price/performance ratio.

The solution according to the present invention runs counter to conceivable solutions in which separate data protection storage is provided in the form of an independent apparatus which is mounted apart from the computer and is connected thereto via a cable. Such solutions are intrinsically already used today in personal computers in the upper performance range. However, these solutions do not prove to be absolutely expedient since, in the case of a desk top computer, they require additional footprint space and leaving out of consideration the weight and the size of current, commercially available separate data storage units. Such separate data storage units are still not handy for use with lap-top computers particularly because of the connections which must be made between the computer and the data storage unit.

Although it seems conceivable to integrate miniaturized data protection storage units directly into a mounting location in a small computer in the future, in other words so that they are integrated in the computer housing, this is offset by the fact that this mounting location would then not be available for additional floppy disc or hard disc storage units. The solution in accordance with the present invention therefore provides all of the advantages of great flexibility. For example, small size computers can be operated either with or without an inserted data protection storage unit. The tape recorder means of the present data protection store can be conveniently and easily coupled to the small size computer or detached therefrom. Due to the possibility of replacing the magnetic tape cassette, such data storage units offer an inherently unlimited memory capacity. The use of a multiple plug connector leads to the necessary connecting paths having very short signal and supply lines. Such plug connectors have matured to the extent at present that they offer adequate shielding possibilities and great protection against external disturbances. Such plug connectors are also designed ruggedly enough so that they are mechanically and electrically able to handle a number of plugging events.

Further advantages of the present invention may be derived from the following description of exemplary embodiments which shall be set forth in greater detail below with reference to the drawings.

BRIEF DESCRIPTION OF THE DRAWINGS

In FIG. 1 is shown a perspective view of a "lap-top" computer having a slide-in location arranged at one lateral surface for inserting a data protection or backup storage unit in the form of a "steaming mode" tape recorder;

FIG. 2 is a perspective view of a further embodiment wherein a streaming mode tape recorder serving as a data protection or backup store is inserted into a slide-in channel which is formed obliquely in the rear cover surface of the lap top computer;

FIG. 5 is a perspective view of a multiple plug connector for connecting a tape recorder to a small size computer; and FIG. 6 is a perspective view of a further embodiment of a multiple plug connector according to the principles of the present invention for connecting a tape recorder to a small size computer.

DESCRIPTION OF THE PREFERRED EMBODIMENTS

Figure 3:
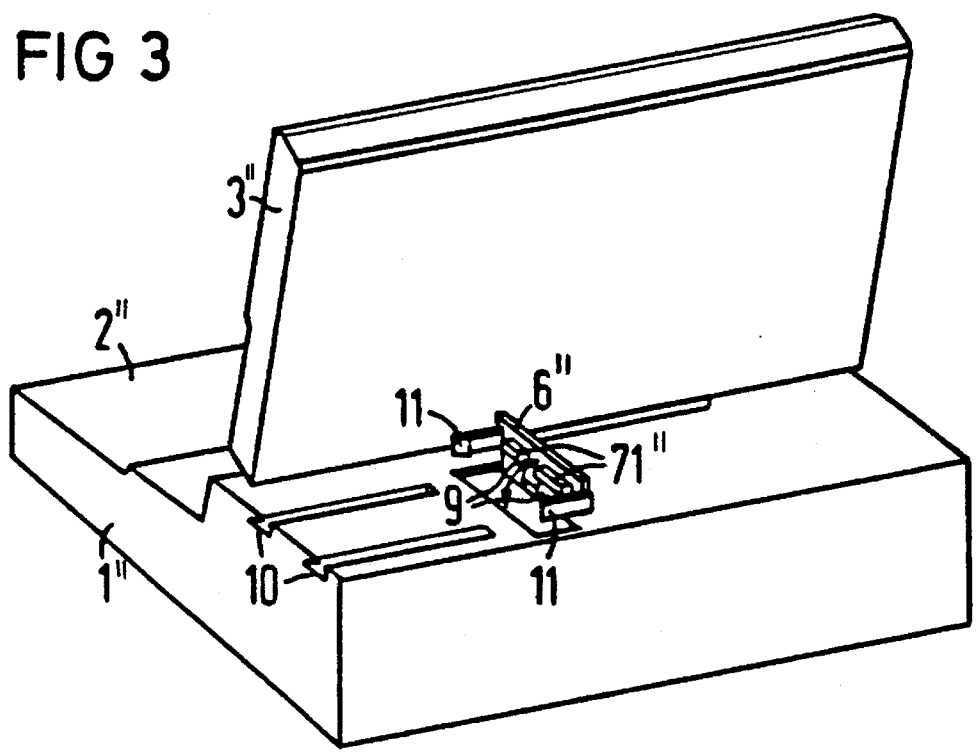
FIG. 3 is a perspective view of a further embodiment in which a pivotable door is provided in the rear surface of the lap top computer, this door carrying the computer side portion of a multiple pin connector on its inside surface onto which a streaming mode tape recorder is pluggable when the door is opened, the tape recorder being pluggable in a direction parallel to the cover surface of the lap top computer.

A lap-top computer having a computer module accommodated within a computer housing 1 is shown schematically in the perspective illustration of FIG. 1. The front surface of the computer housing carries a schematically illustrated input keyboard 2. A display field, or screen, 3 which is hinged up in an operating position is also shown in FIG. 1. In this respect, the illustrated small-size computer corresponds completely to many commercially available devices. Therefore, a more detailed presentation in the drawing as well as a more detailed explanation of the detailed structure of the individual computer are superfluous here.

The illustrated small-size computer is to be operated in combination with a data protection or backup store. In the present case, the data protection store is in the form of a streaming mode tape recorder 4 which is schematically shown next to the computer housing 1 in the exploded view of FIG. 1. The tape recorder 4 has a flat, rectangular frame 41 whose dimensions H×W×L preferably correspond to the 3½ inch form factor which is a defined industrial standard. According to this form factor, mounting locations in small size computers and other electronic equipment are defined with a height H of 41.3 mm, a width W of 101.6 mm, and a length L of 146.1 mm. These dimensions are derived from the U.S. Customary System in which the height H by width W by length L dimensions correspond to 1⅝ inches×4 inches×5¾ inches. Without otherwise modifying the dimensions of a mounting location of the 3½ inch form factor, it is desirable to reduce the structural height H so that the height of the unit is only 25.4 mm or 1 inch.

The tape recorder frame 41 of the tape recorder 4 has a slide-in channel for a data cassette 5 which proceeds in the direction of its longitudinal axis. In FIG. 1, the data cassette 5 is shown only partially inserted into the tape recorder 4. Arrows A indicate that the data cassette 5 is interchangeable.

One feature of the solution illustrated here is that the tape recorder 4 should be connectable to the small size computer 1 via a multiple plug, or multi-pin connector. To this end, the computer housing 1 has a relatively flat mounting location on one of its side walls. This mounting location is closed by a door 6 which may be swiveled out of the side wall of the computer housing 1. When swiveled out, as shown in FIG. 1, a computer side portion 71 of the multi-pin connector is accessible. As shown, a second portion 72 of the multi-pin connector is provided in the tape recorder 4 arranged at the backside thereof. It is inherently at the discretion of a person skilled in the art as to where the plug portions and plug receptacles for the multi-plug connector should be arranged and how these parts are designed in detail, in accordance with traditional plug technology. It is expedient, however, to provide the plug receptacle portion in the tape recorder 4 since the plug pin portion is usually more sensitive in mechanical terms and, when arranged at the computer side, it covered in this case by a door 6 when the tape recorder 4 is removed.

The multi-pin connector serves the purpose of being able to connect the tape recorder 4 by inserting the tape recorder into the computer housing 1 in a simple and reliable way and thereby achieved short and shielded line paths without the necessity of inconvenient cables. The multi-pin connector may also be designed so that, in addition to connections for data signal lines and control lines, it also includes connections for supply lines so that the tape recorder, having an optimized low energy consumption given an appropriate design, can be directly powered from the power supply for the small size computer. The door 6 on the computer housing includes a catch 11', as will be described later.

Referring now to FIG. 2, a further embodiment of a lap-top computer 1' is shown, including a keyboard 2' and a screen 3'. Here, however the mounting location for a data protection store 4' is provided in the rear surface of the computer housing 1'. In the unequipped condition, the mounting location is also covered by a door 6' which can be pivoted out of this surface. A slide-in channel 8 is directed obliquely to the cover surface in this instance, however. Despite relatively little space requirements with respect to the structural height of the computer housing 1', a relatively deep slide-in channel for the tape recorder 4' is thus obtained, and the door 6' can also be used as an additional guide surface. The above-described plug connector technique, moreover, is also used here, although it is not shown in detail for reasons of a clearer illustration.

A further embodiment of a portable computer is shown in FIG. 3, including a housing 1", a keyboard 2", and a screen 3". In this embodiment, too, the slide-in locations for a data protection store is provided at the rear cover surface of the computer housing 1". For reasons of clarity, the tape recorder itself is not shown; by contrast, the door 6" hinged to the rear cover surface of the computer housing 1" is shown pivoted out. As a special characteristic of the embodiment of FIG. 3, the portion 71" of the multi-pin connector at the computer side is fixed at the inside surface of the pivotable door. Flex lines 9 are then provided as connecting lines between the portion 71" of the multi-pin connector at the computer side and the electronic modules which are arranged within the computer housing.

Two guide channels 10 having a dove tail shape are formed in the cover surface of the computer housing and are directed perpendicular to the inside surface of the door 6" when the door is pivoted out to the illustrated open position. A person skilled in the art can then envision without further ado that the bottom surface of the tape recorder frame includes correspondingly shaped raised ribs having a cross section corresponding to the cross section of the guide channels 10. Parallel guidance of the tape recorder 4 as it is slid parallel to the cover surface of the computer housing 1" is thus possible.

The tape recorder is held in the plugged position by latches 11 which, positioned oppositely from one another, project inwardly from the two lateral surfaces of the door 6". The latches 11 are shown as flexible arms extending from each side of the door 6" and having inwardly directed catch projections. A person of skill in the art can envision without further ado that the lateral surfaces of the tape recorder frame 41 include corresponding recesses into which the projections of the latches 11 engage when the tape recorder is in the plugged condition.

It is, however, also possible to secure the tape recorder in the plugged condition by other means as well. For example, in the exemplary embodiment shown in FIG. 1, the door includes a catch nose 11' which projects from the inside surface of the door 6 and proceeds parallel to its longitudinal edge. The catch nose 11' serves to hold the tape recorder 4 in the plugged condition by extending into a corresponding groove in the bottom surface of the tape recorder 4 which proceeds parallel to the rear surface of the tape recorder 4.

Figure 4:
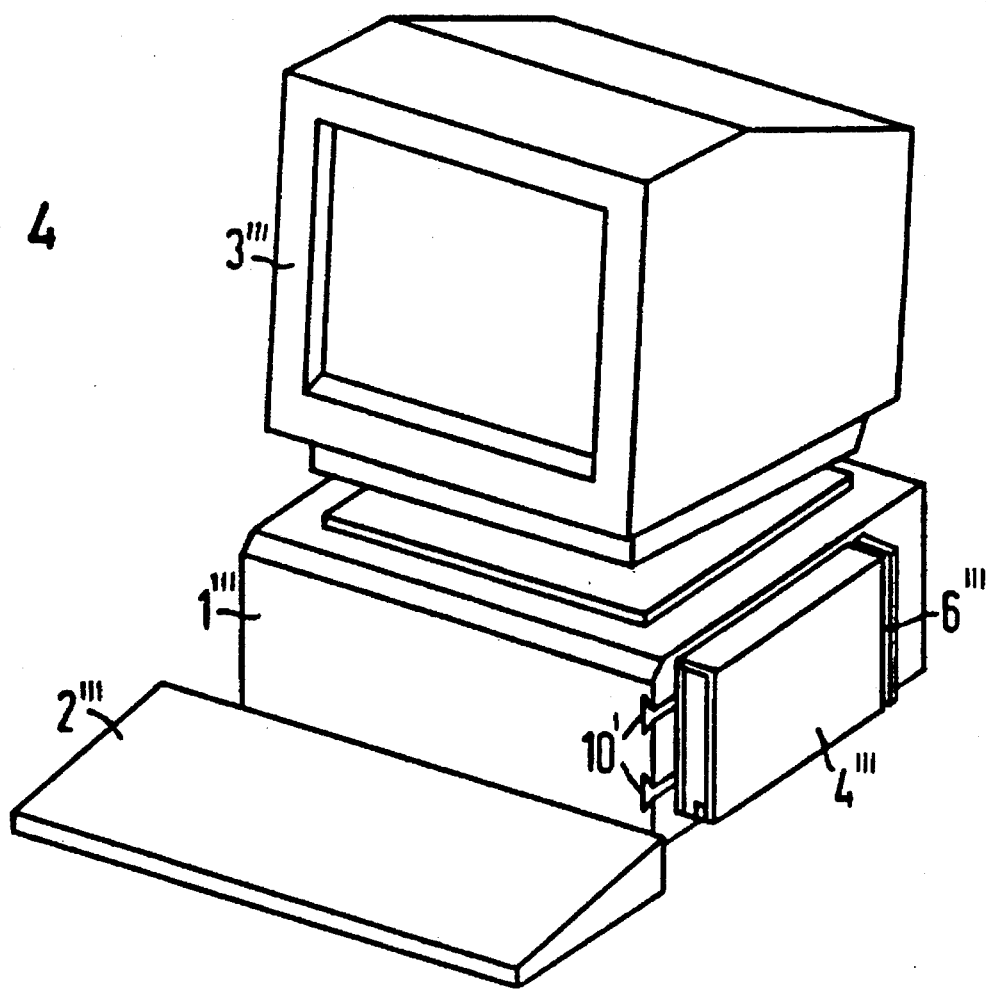
FIG. 4 is a perspective view of a streaming mode tape recorder being used for data protection storage in a desk top computer and arranged at a sidewall of the computer housing.

Finally, in FIG. 4 is shown another embodiment which illustrates that a streaming mode tape recorder 4 may be used not only in lap-top computers, but also as a data protection, or backup, storage unit in desk top computers without further ado. In FIG. 4 is schematically shown a personal computer having a corresponding computer housing 1''', an input keyboard to offset therefrom, and a display unit in the form of a data viewing station 3'''.

The tape recorder 4''' is shown in the plugged condition in FIG. 4. Similar to the embodiment described above with reference to FIG. 3, the tape recorder 4 is slipped onto one of the sidewalls of the computer housing 1'''. A door 6''' is pivotable out of the sidewall, as schematically shown, the door 6''' carrying a portion of a multi-pin connector for the computer side to which a corresponding portion of the multi-pin connector on the tape recorder side is connected.

As can also be seen, the tape recorder 4''' is secured in the plugged condition via guide channels 10' which occupy the least amount of volume within the computer housing 1'''. The guide channels 10' are also expedient since they offer a reliable coupling of the data storage unit 4''' to the computer. In a specific application, however, it might also potentially mean certain limitations since, in the embodiments of FIGS. 3 and 4, the entire bottom surface of the tape recorder frame 41 lies directly against the surface of the computer housing 1. When, for reasons of simplifying the structural format of the tape recorder 4, a separate cooling means therein is forgone, then it may prove beneficial to expose an optimally large portion of the entire surface of the tape recorder frame directly to the ambient air for cooling. In this case, it could be more expedient to provide one of the embodiments described with reference to FIGS. 1 or 2 for connection between the computer and the tape recorder means 4.

FIGS. 5 and 6 each show an example of possible designs for a multiple plug connector, whereby only the plug pin portion is shown for reasons of simplicity, the plug receptacle portion, of course, corresponding to the pin arrangement. The plug pin portion, for example, can be the portion 72 of the plug connector at the apparatus side, as schematically illustrated in FIG. 1. In this case, the plug portion would be arranged at a lateral edge of a printed circuit board in the tape recorder 4. In traditional peripheral equipment connected via line cables to a computer such as a personal computer or the like, the various types of connecting lines are frequently conducted via individual plug conductors including, for example, separate multi-pin plugs for control lines for ESDI (enhanced small device interface), SCSI (small computer system interface), or QUIC interfaces on one hand and for the power supply on the other hand.

In the present case, tolerance precision for individual plug connectors relative to one another would not suffice to assure a convenient plugging of the tape recorder 4 which would always be operationally reliable. Therefore, it is advantageous to provide an integrated plug connector which comprises all line connections between the pluggable unit, i.e. the tape recorder 4, and the computer housing 1.

To this end, FIG. 5 shows an example of a plug portion 72 which is divided into two chambers 73 and 74, respectively. Plug pins 75 for the power supply lines to the tape recorder 4 are arranged in the one chamber 73 and plug pins 76 for the data interface lines are arranged in the other chamber 74.

FIG. 6 shows a further example of a plug portion 72' which is constructed of three chambers 73', 74' and 77. The chambers 73' and 74' again contain the plug pins 75' or 76' for the power supply or interface lines. The third chamber 77 is additionally provided in which plug pins 78 for test lines are arranged.

It is possible without further ado from the illustrated plug parts in FIGS. 5 and 6 to ascertain how the appertaining cooperating plug receptacle portion would be formed, such plug portion 71 being arranged on a printed circuit board in the computer housing in the assumed example. Therefore, a detailed description of the corresponding plug receptacle portions seems unnecessary. It is just as unnecessary to show and describe the arrangement of the parts 71 and 72 of the integrated multiple plug connector on a printed circuit board since a person skilled in the art is universally familiar with such arrangements and a multitude of individual solutions are available for more detailed fashioning and arrangement of the multiple pin connector.

Thus, there has been shown and described a data storage unit for backing up or protecting data in a small size computer using a streaming mode tape recorder which is coupled via a multiple pin connector to the computer. Preferably, a pivotable door on the computer covers the computer portion of the multi-pin connector when not in use and provides a secure plugging position for the tape recorder when in use.

Although other modifications and changes may be suggested by those skilled in the art, it is the intention of the inventor to embody within the patent warranted hereon all changes and modifications as reasonably and properly come within the scope of his contribution to the art.

I claim:

1. A data store for a small size computer having a computer module and a power supply in a housing, a data display field and an input keyboard, comprising:

a memory unit for receiving and retaining data and for selectively emitting the retained data, said memory unit being a streaming mode tape recorder module in a housing, said memory unit being selectively connectable to and alternately removable from the small size computer; and a multi-pin connector having a first part mounted on said memory unit and a second part mounted on said small size computer in said housing, said first and second parts being connectable together when said memory unit is connected to said small size computer to directly connect said streaming mode tape recorder to said computer module, said multi-pin connector including line connections for supply lines, data signals, and control signal lines, said supply lines connecting said memory unit to said power supply of said small size computer.

2. A data store for a small size computer having a computer module and a power supply in a housing, a data display field and an input keyboard, comprising:

a memory unit for receiving and retaining data and for selectively emitting the retained data, said memory unit being a streaming mode tape recorder module in a housing, said memory unit being selectively connectable to and alternately removable from the small size computer; and a multi-pin connector having a first part mounted on said memory unit and a second part mounted on said small size computer in said housing, said first and second parts being connectable together when said memory unit is connected to said small size computer to directly connect said streaming mode tape recorder to said computer module;

wherein said memory unit is a data cassette tape recorder having an interchangeable data carrier so that said interchangeable data carrier is selectively removable and replaceable independently from said data cassette tape recorder independently of removal and replacement of said data cassette tape recorder from said small size computer.

3. A data store as claimed in claim 2, wherein said memory unit comprises:

a tape recorder frame having a slide-in channel for inserting a data cassette as a data carrier, said slide-in channel being arranged perpendicularly to a front side of said tape recorder frame, said first part of said multi-pin connector being on a back side of said tape recorder frame opposite said slide-in channel.

4. A data store for a small size computer having a computer module and a power supply in a housing, a data display field and an input keyboard, comprising:

a memory unit for receiving and retaining data and for selectively emitting the retained data, said memory unit being a streaming mode tape recorder module in a housing, said memory unit being selectively connectable to and alternately removable from the small size computer; and a multi-pin connector having a first part mounted on said memory unit and a second part mounted on said small size computer in said housing, said first and second parts being connectable together when said memory unit is connected to said small size computer to directly connect said streaming mode tape recorder to said computer module;

wherein said memory unit has external dimensions corresponding to a 3½ inch format, with a structural height not exceeding approximately 1 inch.

5. A data store for a small size computer having a computer module and a power supply in a housing, a data display field and an input keyboard, comprising:

a memory unit for receiving and retaining data and for selectively emitting the retained data, said memory unit being a streaming mode tape recorder module in a housing, said memory unit being selectively connectable to and alternately removable from the small size computer; and a multi-pin connector having a first part mounted on said memory unit and a second part mounted on said small size computer in said housing, said first and second parts being connectable together when said memory unit is connected to small size computer to directly connect said streaming mode tape recorder to said computer module;

a pivotable door on a surface of said housing, said pivotable door covering said second part of said multi-pin connector when in a first position.

6. A data store as claimed in claim 5, further comprising:

means for defining a flat slide-in channel for accepting said memory unit; and means for securing said memory unit in a plugged position in said housing.

7. A data store as claimed in claim 6, wherein said slide-in channel is arranged perpendicularly to a wall surface of said housing.

8. A data store as claimed in claim 6, wherein said slide-in channel is arranged obliquely relative to a wall surface of said housing and, said pivotable door simultaneously forming a guide surface for said memory unit to be introduced.

9. A data store as claimed in claim 6, wherein said means for securing includes at least one catch projection projecting from an inside surface of said pivotable door when said pivotable door is pivoted to an open position, and a correspondingly shaped recess in said tape recorder frame for engaging said at least one catch projection.

10. A data store as claimed in claim 6, wherein said means for securing comprises latches extending from opposite sides of said pivotable door and positioned opposite one another and including inwardly salient portions, and recesses in lateral surfaces of said tape recorder frame having shapes corresponding to said salient portions into which said latches engage to embrace said memory unit when said memory unit is in a plugged position.

11. A data store for a small size computer having a computer module and a power supply in a housing, a data display field and an input keyboard, comprising:

a memory unit for receiving and retaining data and for selectively emitting the retained data, said memory unit being a streaming mode tape recorder module in a housing, said memory unit being selectively connectable to and alternately removable from the small size computer; and a multi-pin connector having a first part mounted on said memory unit and a second part mounted on said small size computer in said housing, said first and second parts being connectable together when said memory unit is connected to said small size computer to directly connect said streaming mode tape recorder to said computer module;

a pivotable door on a surface of said housing, said pivotable door releasing said second part of said multi-pin connector for connection of said memory unit when pivoted out.

12. A data store as claimed in claim 11, wherein said multi-pin connector is mounted on an inside surface of said pivotable door, and further comprising:

flex lines connected between said second part of said multi-pin connector and said computer module of said small size computer.

13. A data store as claimed in claim 12, further comprising:

guide channels provided in a wall surface of said housing on which said pivotable door is provided, said guide channels proceeding perpendicular to an inside surface of said pivotable door when said door is pivoted out to an open position; and salient guide ribs provided on a bottom surface of said tape recorder frame and having a cross section corresponding to said guide channels in said housing so that parallel guidance for coupling said memory unit to said housing is possible.

14. A data store as claimed in claim 13, wherein said guide channels are dove-tail shaped in cross section.

* * * * *